United States Patent [19]

Onodera et al.

[11] 4,274,136

[45] Jun. 16, 1981

[54] BOBBIN STRUCTURE FOR HIGH VOLTAGE TRANSFORMERS

[75] Inventors: Toshio Onodera, Kamakura; Ken Tanimura, Tokyo, both of Japan

[73] Assignee: Sony Corporation, Tokyo, Japan

[21] Appl. No.: 71,198

[22] Filed: Aug. 30, 1979

[30] Foreign Application Priority Data

| | | | |
|---|---|---|---|
| Sep. 1, 1978 | [JP] | Japan | 53-119951[U] |
| Sep. 1, 1978 | [JP] | Japan | 53-119952[U] |
| Oct. 20, 1978 | [JP] | Japan | 53-144831[U] |

[51] Int. Cl.[3] .......... H02M 7/00; H01F 27/30

[52] U.S. Cl. .......... 363/68; 336/185; 336/208

[58] Field of Search .......... 123/148 D; 363/68, 144, 363/146; 336/192, 198, 208, 185

[56] References Cited

U.S. PATENT DOCUMENTS

| | | | |
|---|---|---|---|
| 863,175 | 8/1907 | Heinze, Jr. | 336/185 X |
| 3,551,866 | 12/1970 | Chass | 336/208 X |
| 4,091,349 | 5/1978 | Niederjohn et al. | 336/198 X |
| 4,151,500 | 4/1979 | Malerba et al. | 336/192 X |
| 4,156,888 | 5/1979 | Takahashi | 336/192 X |

FOREIGN PATENT DOCUMENTS

| | | | |
|---|---|---|---|
| 2309023 | 11/1976 | France | 336/208 |
| 752570 | 7/1956 | United Kingdom | 123/148 D |
| 123628 | 4/1958 | U.S.S.R. | 336/185 |

*Primary Examiner*—Thomas J. Kozma

*Attorney, Agent, or Firm*—Hill, Van Santen, Steadman, Chiara & Simpson

[57] ABSTRACT

A coil bobbin for a fly-back transformer or the like having a bobbin proper. A plurality of partition members or flanges are formed on the bobbin proper with a slot between adjacent ones. At least first and second coil units are formed in the bobbin proper, each having several slots, formed between the flanges, and first and second high voltage coils are wound on the first and second coil units in opposite directions, respectively. A rectifying means is connected in series to the first and second coil units, and a cut-off portion or recess is provided on each of the partition members. In this case, a wire lead of the coil units passes from one slot to an adjacent slot through the cut-off portion which is formed as a delta groove, and one side of the delta groove is corresponded to the tangent direction to the winding direction.

6 Claims, 12 Drawing Figures

BOBBIN STRUCTURE FOR HIGH VOLTAGE TRANSFORMERS

BACKGROUND OF THE INVENTION

1. Field of the Invention

The present invention relates generally to a bobbin structure for high voltage transformers, and is directed more particularly to a bobbin structure for high voltage transformer suitable for automatically winding coils thereon.

2. Description of the Prior Art

In the art, when a wire lead is reversely wound on a bobbin separately at every winding block, a boss is provided at every winding block and the wire lead is wound on one block, then one end of the wire lead is tied to the boss where it will be cut off. The end of the wire lead is tied to another boss, and then the wire lead is wound in the opposite direction. Therefore, the prior art winding method requires complicated procedures and the winding of the wire lead cannot be rapidly done and also the winding can not be performed automatically. Further, the goods made by the prior art method are rather unsatisfactory and have a low yield.

OBJECTS AND SUMMARY OF THE INVENTION

Accordingly an object of the invention is to provide a coil bobbin for a fly-back transformer or the like by which a wire lead can be automatically wound on winding blocks of the coil bobbin even though the winding direction is different among the different winding blocks.

Another object of the invention is to provide a coil bobbin for a fly-back transformer or the like in which a bridge member and an inverse engaging device for transferring a wire lead from one wiring block to an adjacent wiring block of the coil bobbin and wiring the wire lead in opposite wiring directions between adjacent wiring blocks, and a guide member for positively guiding the wire lead are provided.

According to an aspect of the present invention, a coil bobbin for a fly-back transformer or the like is provided which comprises a plurality of partition members forming a plurality of slots, a first coil unit having several slots on which a first high voltage coil is wound in one winding direction, a second coil unit having several slots on which a second high voltage coil is wound in the other direction, a rectifying means connected in series to the first and second coil units, and a cut-off portion provided on each of the partition members, a wire lead passing from one slot to an adjacent slot through the cut-off portions, each of the cut-off portions being formed as a delta groove, and one side of the delta groove corresponding to a tangent to the winding direction.

The other objects, features and advantages of the present invention will become apparent from the following description taken in conjunction with the accompanying drawings through which the like reference numerals and letters designate the same elements and parts, respectively.

DESCRIPTION OF THE PREFERRED EMBODIMENT

When the high voltage winding of a fly-back transformer used in a high voltage generating circuit of a television receiver is divided into plural ones and then wound on a bobbin, the divided windings (divided coils) are connected in series through a plurality of rectifying diodes.

Figure 1:
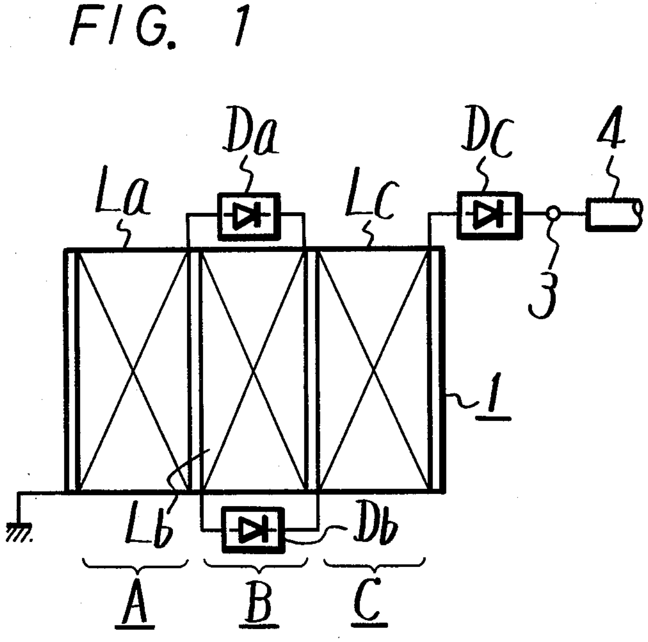
FIG. 1 is a schematic diagram showing the construction of a fly-back transformer.

When the winding is divided into, for example, three portions, such as divided coils La, Lb and Lc, they are wound on a bobbin proper 1 from, for example, left to right sequentially in this order as shown in FIG. 1. In this case, if the divided coils La and Lc are selected to have the same sense of turn and the middle coil Lb is selected to have the opposite sense of turn from the coils La and Lc, the distance between the terminal end of coil La and the start of coil Lb and the distance between the terminal end of coil Lb and the start of coil Lc can be got relatively long. Therefore, diodes Da and Db can be mounted by utilizing the space above the block on which the middle coil Lb is wound as shown in FIG. 1, so that it becomes useless to provide spaces for diodes between the divided coils La and Lb and between the divided coils Lb and Lc and hence the bobbin proper 1 can be made compact.

Figure 2:
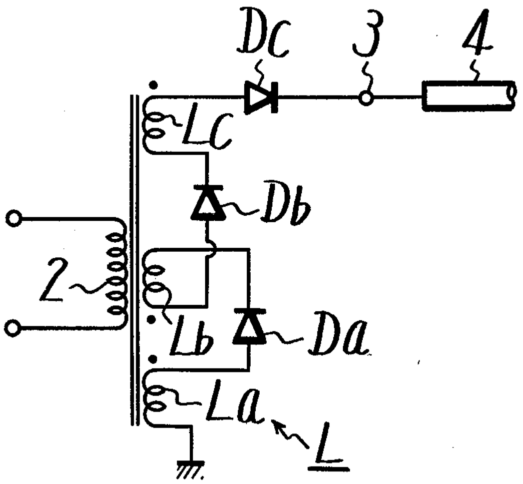
FIG. 2 is a connection diagram showing an example of the electrical connection of the fly-back transformer shown in FIG. 1.

FIG. 2 is a connection diagram showing the connection of the above fly-back transformer. In FIG. 2, reference numeral 2 designates a primary winding (Primary coil) of the fly-back transformer, reference letter L designates its high voltage winding (secondary coil), including divided coils La, Lb and Lc, 3 an output terminal, and 4 a lead wire connected to the anode terminal of a cathode ray tube (not shown), respectively.

An example of the bobbin structure according to the invention, which is suitable to automatically wind coils, which are different in sense of turn in each winding block as shown in FIG. 1, on the bobbin, will be hereinafter described with reference to the drawings.

Figure 3:
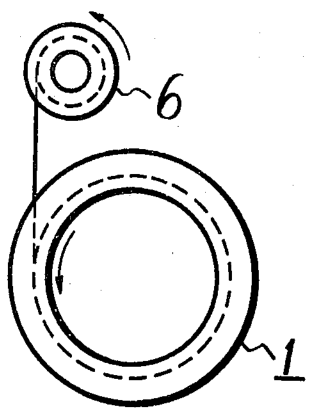
FIG. 3 is a schematic diagram showing an example of a device for automatically winding a wire lead of the fly-back transformer on its bobbin.

FIG. 3 is a diagram showing an automatic winding apparatus of a wire lead on a coil bobbin. If it is assumed that the wire lead is wound in the order of winding blocks A, B and C in FIG. 1 and the wire lead is wound on the block A with the bobbin proper 1 being rotated in the counter-clockwise direction as shown in FIG. 3, the relation between the bobbin proper 1 and the wire lead becomes as shown in FIG. 3. In this figure, reference numeral 6 designates a bobbin for feeding the wire lead.

Figure 4:
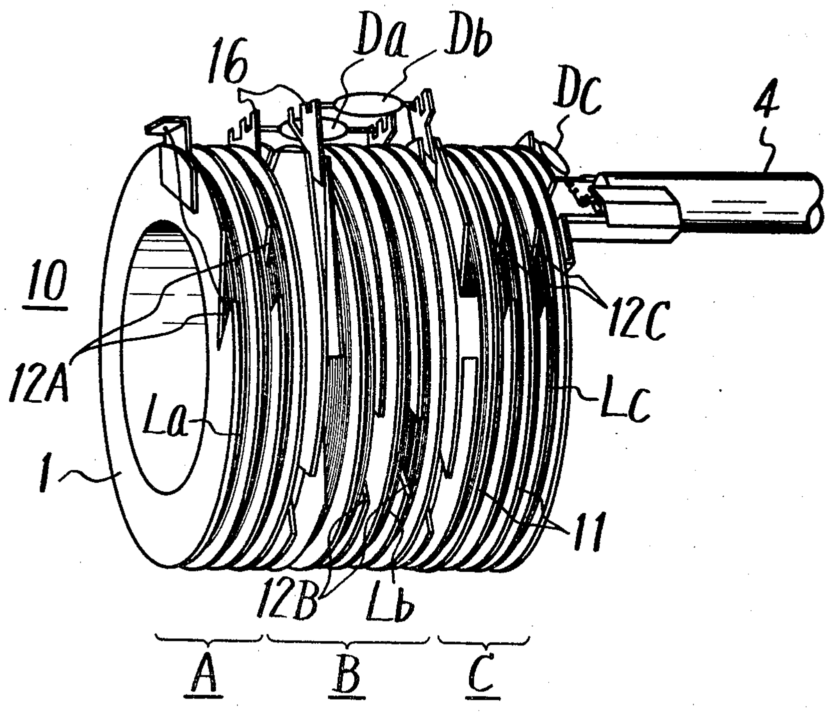
FIG. 4 is a perspective view showing an example of the coil bobbin according to the present invention.

Turning to FIG. 4, an example 10 of the bobbin structure or coil bobbin according to the present invention will be described now. In this example, the winding blocks A, B and C for the divided coils La, Lb and Lc are respectively divided into plural slots or sections by plural partition members or flanges 11, and a cut-off portion or recess 12 is formed on each of the flanges 11 through which the wire lead in one section is transferred to the following winding section.

As shown in FIG. 6, each recess 12 is so formed that its one side extends in the direction substantially coincident with the tangent to the circle of the bobbin proper 1 and its direction is selected in response to the sense of turn of the winding or wire lead. In this case, the direction of recess 12 means the direction of the opening of recess 12, and the direction of recess 12 is selected opposite to the sense of turn of the winding in the present invention.

Figure 6A:
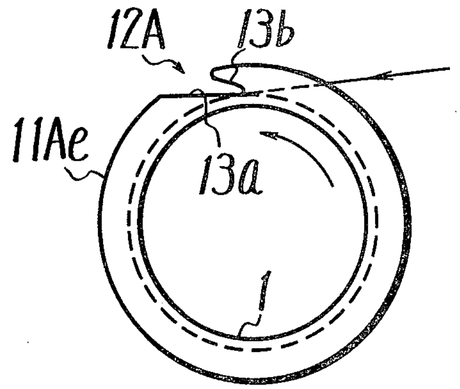
Figure 6B:
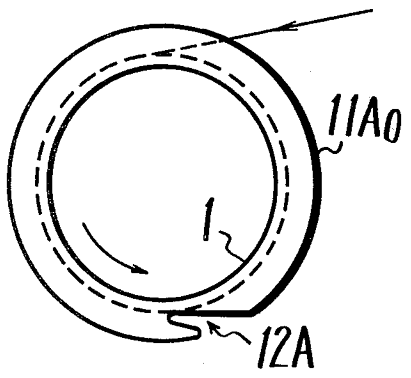

Now, recesses 12A, which are formed in the winding block A, will be now described by way of example. The positions of recesses 12A formed on an even flange 11Ae and an odd flange $11A_0$ are different, for example, about 180° as shown in FIGS. 6A and 6B. Since the bobbin proper 1 is rotated in the counter-clockwise direction in the winding block A and hence the sense of turn of the wire lead is in the clockwise direction, the recess 12A is formed on the even flange 11Ae at the position shown in FIG. 6A. That is, the direction of recess 12A is inclined with respect to the rotating direction of bobbin proper 1 as shown in FIG. 6A. In this case, one side 13*a* of recess 12A is coincident with the tangent to the circle of bobbin proper 1, while the other side 13*b* of recess 12A is selected to have an oblique angle with respect to the side 13*a* so that the recess 12A has a predetermined opening angle.

The opening angle of recess 12A is important but the angle between the side 13*a* of recess 12A and the tangent to the circle of bobbin proper 1 is also important in the invention. When the wire lead is bridged or transferred from one section to the following section through the recess 12A, the wire lead in one section advances to the following section in contact with the side 13*a* of recess 12A since the bobbin proper 1 is rotated. In the invention, if the side 13*a* of recess 12A is selected to be extended in the direction coincident with the tangent to the circle of bobbin proper 1, the wire lead can smoothly advance from one section to the next section without being bent.

Figure 6C:
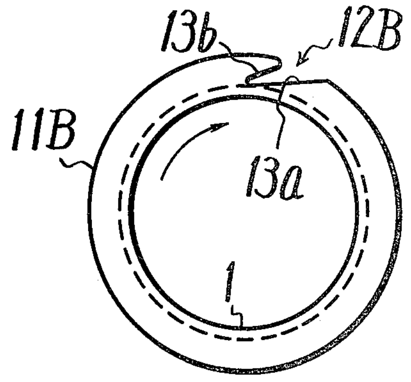
Figure 6D:
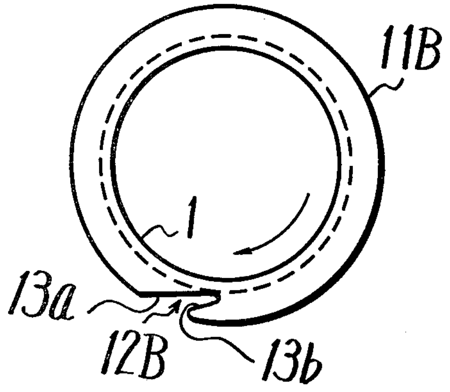

In the invention, since the middle divided coil Lb is wound opposite to the divided coil La, a recess 12B provided on each of flanges 11B of the winding block B is formed to have an opening opposite to that of recess 12A formed in the winding block A as shown in FIGS. 6C and 6D.

Figure 5:
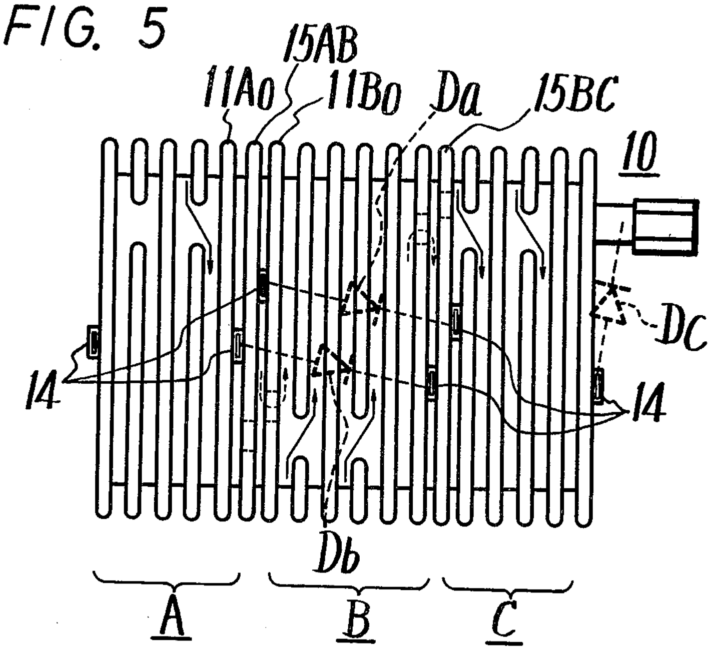
FIG. 5 is a plan view of FIG. 4.

As shown in FIG. 5, terminal attaching recesses 14 are provided between the winding blocks A and B to which diodes are attached respectively. In the illustrated example of FIG. 5, a flange 15AB is formed between the flanges $11A_0$ and $11B_0$ of winding blocks A and B, and the recesses 14 are formed between the flanges $11A_0$ and 15AB and between 15AB and $11B_0$ at predetermined positions. Then, terminal plates 16, shown in FIG. 4, are inserted into the recesses 14 and then fixed there to, respectively. The terminal plates 16 are not shown in FIG. 5. Between the winding blocks B and C and between the blocks A and B, similar terminal attaching recesses 14 are formed, and terminal plates 16 are also inserted thereinto and then fixed thereto.

As described above, since the divided coil Lb is wound opposite to the divided coils La and Lc, it is necessary that the winding direction of the wire lead be changed when the wire lead goes from the block A to block B and also from the block B to block C, respectively.

Figure 7:
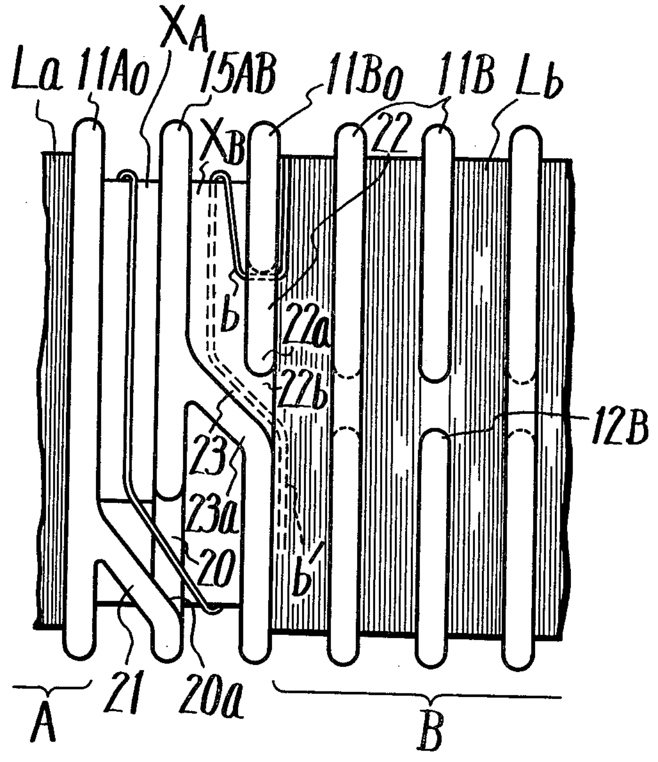
FIGS. 6 and 7 are views used for explaining recesses or cut-off portions shown in FIGS. 4 and 5.

Turning to FIG. 7, an example of the winding or wire lead guide means according to the present invention will be now described. In FIG. 7, there are mainly shown a bridge member for the wire lead and an inverse member or means for the wire lead which are provided between the winding blocks A and B. At first, a bridge means 20 and its guide means 21, which form the bridge member, will be described. The bridge means 20 is provided by forming a cut-out portion or recess in the middle flange 15AB located between the winding blocks A and B. In close relation to the bridge means or recess 20, the guide means 21 is provided on a bridge section $X_A$ at the side of block A. This guide means 21 is formed as a guide piece which connects an edge portion 20*a* of recess 20 at the winding direction side to the flange $11A_0$ of block A in the oblique direction along the winding direction through the section $X_A$.

Figure 8A:
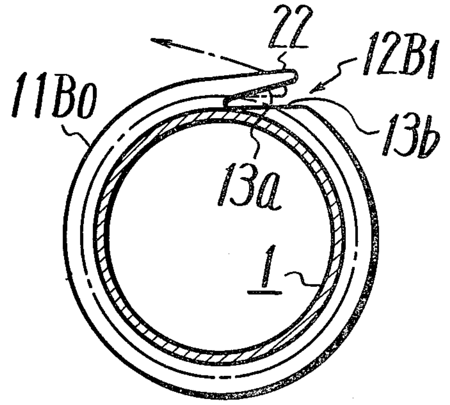
FIGS. 8A and 8B cross-sectional views showing an example of the inverse engaging means according to the present invention.
Figure 8B:
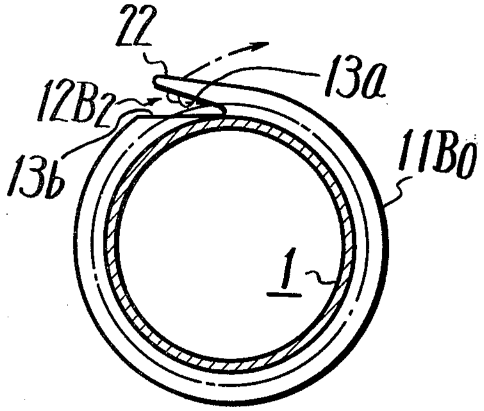

Next, an inverse engaging means 22 will be now described with reference to FIGS. 7 and 8. If the flange $11B_0$ of FIG. 7 is viewed from the right side, the inverse engaging means 22 can be shown in FIG. 8A. In this case, the tip end of one side 13*a* of recess $12B_1$ is formed as a projection which is extended outwards somewhat beyond the outer diameter of flange $11B_0$. The inverse engaging means 22 may take any configuration but it is necessary that when the rotating direction of the bobbin proper 1 is changed to the clockwise direction, the wire lead can be engaged with the recess $12B_1$ or projection of one side 13*a* and then suitably transferred to the next station.

Another guide means 23 is provided on a bridge section $X_B$ at the side of winding block B in close relation to the inverse engaging means 22. The guide means 23 is formed as a guide surface which is a projected surface from the bottom surface of section $X_B$ and extended obliquely in the winding direction. This guide means or guide surface 23 is inclinded low into the means 22 and has an edge 23*a* which is continuously formed between the middle flange 15AB and the flange $11B_0$.

In this case, it is possible that the guide means 21 and guide surface 23 are formed to be the same in construction. That is, both the guide means 21 and 23 can be made of either the guide piece, which crosses the winding section or guide surface projected upwards from the bottom surface of the winding section. It is sufficient if the guide means 21 and 23 are formed to smoothly transfer the wire lead from one section to the next section under the bobbin proper 1 being rotated.

Although not shown, in connection with the middle flange 15BC between the winding blocks B and C, there are provided similar bridge means 20, guide means 21, inverse engaging means 22 and another guide means 23, respectively. In this case, since the winding direction of the wire lead is reversed, the forming directions of the means are reverse but their construction is substantially the same as that of the former means. Therefore, their detailed description will be omitted.

According to the bobbin structure of the invention with the construction set forth above, the wire lead, which is transferred from the block A to the section $X_A$ by the rotation of bobbin proper 1, is wound on the section $X_B$ from the section $X_A$ after being guided by the guide piece 21 to the recess 20 provided on the middle flange 15AB, and then transferred to the recess 22 provided on the flange $11B_0$ guide surface 23, bridged once to the first section of winding block B through the recess 22 (refer to dotted lines b in FIG. 7). Then, if the rotating direction of the bobbin proper 1 is reversed, the wire lead is engaged with the bottom of recess 22 (refer to solid lines b in FIG. 7). Thus, if the above reverse rotation of bobbin proper 1 is maintained, the wire lead is wound on the block B in the direction reverse to that of block A. When the wire lead is transferred from the block B to block C, the same effect as that above is achieved. Therefore, according to the present invention, the wire lead can be automatically and continuously wound on the bobbin proper 1.

After the single wire lead is continuously wound on blocks A, B and C of bobbin proper 1 as set forth above, the wire lead is cut at the substantially center of each of its bridging portions. Then, the cut ends of the wire lead are connected through diodes Da, Db and Dc at the terminal plates 16, respectively by solder.

In the present invention, the projection piece, which has the diameter greater than that of the flange 11B, is provided in the bridge recess 12 to form the inverse engaging means 22 as described above, so that when the winding direction is changed, the wire lead engages with the inverse engaging means 22 without errors when reversing the winding direction of the wire lead.

If the diameter of the projection piece of means 22 is selected, for example, to be the same as that of the flange 11B, it will not be certain that the wire lead engages with the means 22 because it depends upon the extra length of the wire lead and hence errors in winding cannot be positively avoided.

Further, in this invention, the bridge means is provided on the flange positioned at the bridging portion of the bobbin which has a number of dividing blocks separated by flanges, and the inverse engaging means is provided and also the guide means is provided at the former winding section to cooperate with the inverse engaging means. Therefore, the wire lead can be positively fed to the bridge means, and the transfer of the wire lead to the following winding section can be carried out smoothly.

Further, in this invention since one side of the recess 12 is selected coincident with the tangent of the outer circle of the bobbin proper 1 and also with the winding direction, the wire lead can be smoothly bridged to the following section. Due to the fact that the direction of recess 12 is changed in response to the winding direction, even if there is a block on which the wire lead is wound in the opposite direction to that of the other block, the wire lead can be continuously and automatically wound through the respective blocks.

The above description is given for the case where the present invention is applied to the coil bobbin for the high voltage winding of a fly-back transformer, but it will be clear that the present invention can be applied to other coil bobbins which require divided windings thereon with the same effects.

It will be apparent that many modifications and variations could be effected by one skilled in the art without departing from the spirits or scope of the novel concepts of the present invention, so that the spirits or scope of the invention should be determined by the appended claims only.

We claim as our invention:

1. A fly-back transformer comprising a coil bobbin comprising a plurality of parallel spaced discs with a first adjacent plurality of said disc formed with delta shaped slots having first edges which extend tangentially to a first winding direction and a first winding wound on said first adjacent plurality of said discs in said first winding direction, a second adjacent plurality of said discs formed with delta shaped slots having first edges which extend tangentially to a second winding direction opposite said first winding direction and a second winding wound on said second adjacent plurality of said discs in said second winding direction, a third adjacent plurality of said discs formed with delta shaped slots having first edges which extend tangentially to said first winding direction and a third winding wound on said third adjacent plurality of said discs in said first winding direction and said second plurality of adjacent discs mounted between said first and third plurality of adjacent discs.

2. A fly-back transformer according to claim 1 wherein adjacent ones of said first adjacent plurality of discs are mounted such that their delta shaped slots are orientated 180 degrees relative to each other.

3. A fly-back transformer according to claim 2 including a first winding turning partition mounted between said first and second adjacent plurality of discs and formed with grooves and notches for changing winding direction between said first and second windings and a second winding turning partition mounted between said second and third adjacent plurality of discs and formed with grooves and notches for changing the winding direction between said second and third windings.

4. A fly-back transformer according to claim 3 wherein said first and second winding turning partitions are formed with winding guiding slots for guiding the winding between the first, second and third adjacent plurality of discs.

5. A fly-back transformer according to claim 2 including a first rectifying means connected between one end of said first winding and one end of said second winding, and a second rectifying means connected between the second end of said second winding and one end of said third winding.

6. A fly-back transformer according to claim 5 wherein the second end of said first winding is grounded and a third rectifying means connected between the second end of said third winding and an output terminal.

* * * * *